(12) United States Patent
Bové Bofill et al.

(10) Patent No.: US 9,262,769 B2
(45) Date of Patent: Feb. 16, 2016

(54) COMPUTER IMPLEMENTED METHODS FOR PROTECTING AND PROMOTING PRODUCTS OF A GIVEN BRAND BY USING MACHINE READABLE CODES

(71) Applicant: CODIWISE S.L., Salt, Girona (ES)

(72) Inventors: Llorenç Bové Bofill, Girona (ES); Alexandre Barceló Llauger, Girona (ES); Jordi Gili Tremoleda, Girona (ES)

(73) Assignee: CODIWISE S.L., Salt, Girona (ES)

( * ) Notice: Subject to any disclaimer, the term of this patent is extended or adjusted under 35 U.S.C. 154(b) by 16 days.

(21) Appl. No.: 14/336,184

(22) Filed: Jul. 21, 2014

(65) Prior Publication Data

US 2016/0019575 A1    Jan. 21, 2016

(51) Int. Cl.
*G06K 7/14* (2006.01)
*G06Q 30/00* (2012.01)
*G06Q 30/02* (2012.01)

(52) U.S. Cl.
CPC .......... *G06Q 30/0225* (2013.01); *G06K 7/1404* (2013.01)

(58) Field of Classification Search
CPC .................. G06K 7/1404; G06Q 30/0225
USPC .................... 235/462.01, 487; 705/14.26
See application file for complete search history.

(56) References Cited

U.S. PATENT DOCUMENTS

| | | | |
|---|---|---|---|
| 8,272,562 B2 | 9/2012 | Ziegler | |
| 2002/0126918 A1* | 9/2002 | Solis | G09B 21/007 382/306 |
| 2009/0150251 A1* | 6/2009 | Zhitomirsky | G06Q 30/0601 705/26.1 |
| 2011/0313946 A1* | 12/2011 | Browne | G06Q 20/10 705/36 R |
| 2012/0136698 A1* | 5/2012 | Kent | G06Q 20/3276 705/14.1 |
| 2012/0215617 A1* | 8/2012 | Shah | G06Q 30/02 705/14.35 |
| 2013/0110607 A1* | 5/2013 | Basmajian | G06Q 30/0234 705/14.26 |
| 2013/0297407 A1* | 11/2013 | Hymel | G06Q 30/0267 705/14.43 |
| 2014/0358664 A1* | 12/2014 | Wheeler | G06Q 30/0233 705/14.33 |
| 2015/0127534 A1* | 5/2015 | Bhambhani | G06Q 20/40 705/44 |

* cited by examiner

*Primary Examiner* — Christle I Marshall
(74) *Attorney, Agent, or Firm* — RatnerPrestia

(57) ABSTRACT

Computer implemented methods for protecting and promoting products of a given brand by using machine readable codes, including assigning, by a given brand, a particular value to a machine readable code localized in a packaging of a product; a user scanning the machine readable code by using a mobile computing device having installed therein a processor adapted to read the machine readable code; upon the scanning being performed, establishing communication between the processor and a remote server for storing the scanned code and performing a series of checkings of the scanned code; depending on the result of the checkings the remote server assigns a monetary compensation from the brand to the user that is delivered through the processor; and the processor informing the user about the checking, wherein the machine readable code contains information regarding a marketing campaign of the given brand, a product code and the particular value encrypted.

20 Claims, 1 Drawing Sheet

COMPUTER IMPLEMENTED METHODS FOR PROTECTING AND PROMOTING PRODUCTS OF A GIVEN BRAND BY USING MACHINE READABLE CODES

FIELD OF THE INVENTION

The present invention relates to methods for promoting products and/or companies. In particular, the invention relates to computer implemented methods for protecting and promoting products of a given brand by using machine readable codes.

BACKGROUND OF THE INVENTION

A known method for promoting products is patent application CN-A-102663619 which provides a system for realizing rebate and sales promotion by a consumer product manufacturer with utilization of a mobile terminal and a rebate and sales promotion realization method thereof. In this patent application it is described that by means of scanning a Quick Response (QR) code a user can obtain promotions and information regarding a product.

Another related method is described in U.S. Pat. No. 8,272,562, which provides methods and promotional hang tags, tags or labels with associated product samples combined with interactive quick response or scan-able codes linked to internet Uniform (or Universal) Resource Locator (URL) for providing contact information, promotional or cross promotional product samples or products and related marketing information regarding product promotional or cross-promotional features, where the hang tag, tag or label carries any scan-able quick response internet URL code or QR code and an integral product sample.

Nonetheless, in none of the known methods in the field, contrary to the present invention, the scanning of machine readable codes such as a QR code, a barcode, or any other, allows a consumer (a user) to receive a monetary compensation for said scanning allowing retaining such a consumer as a client.

SUMMARY OF THE INVENTION

The invention according to a first aspect provides a computer implemented method for protecting and promoting products of a given brand by using machine readable codes, wherein the method comprises: assigning, by a given brand, a particular value to a machine readable code, said machine readable code been localized according to a preferred embodiment in a packaging, inside or on said packaging, of a product of said given brand; scanning by a user said machine readable code by means of using a mobile computing device having installed therein a processor adapted to read said machine readable code; upon said scanning being performed, establishing a communication between said computing application and a remote server through a communication network in order said remote server storing the scanned machine readable code and performing a first checking about properties of the code; performing a second checking, said remote server, whether the scanned machine readable code has been scanned before; depending on the result of said checkings the remote server assigning a monetary compensation from the product brand to said user that is delivered through said processor; and the processor informing the user about said checkings. Wherein said machine readable code contains information regarding a marketing campaign of said given brand, a product code and said particular value encrypted.

Each machine readable code proposed for a particular product of a given brand may have assigned different values; the user doesn't knowing the assigned value until the scanning is performed.

The cited machine readable code can also be attached to any viewable support such as a poster, advertising panel, ticket, screen of a computing device, etc.

In accordance with an embodiment, once said checking results of the machine readable code are read once, and said delivering occurred, the delivering of the monetary compensation is disabled.

In accordance with another embodiment, the scanning of the machine readable code is only possible along a given period, in different time slots, before the delivering of the monetary compensation is disabled. In this case, the processor may notify the user when said given period for performing said scanning is again possible. This allows to apply the concept of this invention to a set of products each including a machine readable code that can be read along a period of time at a given slots.

Another aspect of the invention provides a computer implemented method for protecting and promoting products of a given brand by using machine readable codes, wherein the method comprises: assigning, by a given brand, a particular value to a machine readable code, said machine readable code been localized in a packaging of a product of said given brand; scanning by a user said machine readable code by means of using a mobile computing device having installed therein a processor adapted to read said machine readable code; upon said scanning being performed, establishing a communication between said computing application and a remote server through a communication network in order said remote server storing the scanned machine readable code and performing a first checking about properties of the code; performing a second checking, said remote server whether the scanned machine readable code has been scanned more than a given maximum number of times; depending on the result of said checkings under said given maximum number of times of machine readable codes being scanned the remote server assigning a monetary compensation from the product brand to said user that is delivered through said processor, and the processor informing the user about said checkings. Wherein said machine readable code contains information regarding a marketing campaign of said given brand and said particular value encrypted.

According to the invention, the machine readable code is preferably a QR code, however this is not limitative, as any machine readable codes such as a barcode is also possible. In accordance with some embodiments, the machine readable code is associated to another readable code identifying the product, including at least a barcode, a QR code, an alphanumeric code or a numeric code.

The first checking of the machine readable code properties includes checking if the machine readable code is a valid code compatible with the processor and said properties about the machine readable code include checking if the brand or campaign is still active for said promotion, if the machine readable code has been activated by another user, etc. In addition, the first checking also verifies whether said product is original from the brand, thus avoiding fraud or fake of the product and ensuring originality of the same. This is done in cooperation with the own brand.

Furthermore, the remote server stores in a database the data of the user/s having received a given compensation and a location of said user/s when scanning the machine readable code.

According to the invention the encryption of the information regarding a marketing campaign, the product code and the particular value is preferably performed via the use of security certificates of 2048 bits. A double encryption is also possible in order to improve security of the information.

The monetary compensation is preferably delivered to the user once an accumulated given amount of money is reached, for instance every 20 Euros or Dollars. Then, when said amount is reached the computing application may notify the user. The user has access, at any time, through the processor to the given amount of money accumulated.

The methods described herein may be implemented by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

This acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

Present invention by the capturing of machine readable codes and the use of geolocation allows moving the promotion of any company/brand to the consumer at the time of consumption of the product (or service). The success of the experience is twofold; on the one hand the consumer receives a promotion from one form extremely simple (scanning with a mobile computing device the code), and on the other hand, the brand is rewarded with the desired information from his/her client. As users scan codes and earn money, brands receive information data and requested statistics.

BRIEF DESCRIPTION OF THE DRAWINGS

The previous and other advantages and features will be more fully understood from the following detailed description of embodiments, with reference to the attached, which must be considered in an illustrative and non-limiting manner, in which.

DETAILED DESCRIPTION OF SEVERAL EMBODIMENTS

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

Figure 1:
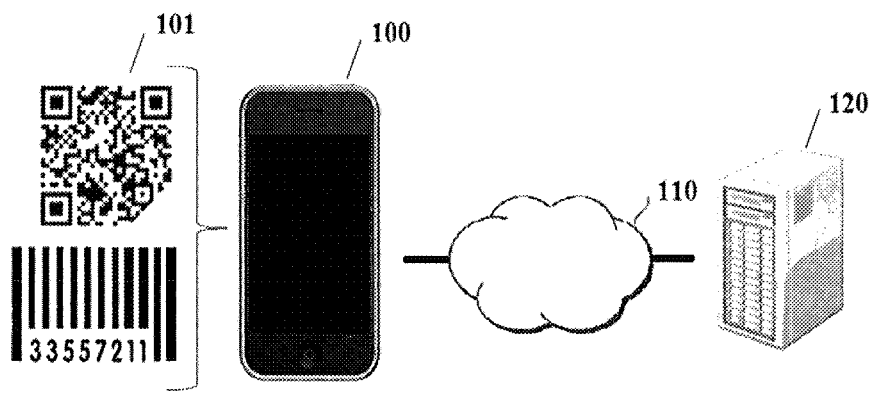
FIG. 1 is a schematic representation of the invention's general architecture.

Referring to FIG. 1 it is illustrated the invention's general architecture. The architecture includes an end-user device 100 including a mobile computing device such as a Smartphone suitable for scanning a machine readable code 101 including in this example a Quick Response (QR) code or a barcode. The computing functions for executing said scanning are typically provided by a computing application termed Codiwise® running on the processor of the end-user device 100 (not illustrated). A remote server 120 for storing the scanned machine readable code and performing a series of checkings about properties of the machine readable code. The interaction, or communication, between the end-user device 100 and the remote server 120 is performed through a telecommunications network 110.

The telecommunications network 110 may be any network, or combination of networks, capable of establishing a communication between end users 100 and the remote server 120. For example, the telecommunications network 110 may be a mobile telephone network including at least 2G, 3G or LTE networks or a data network (such as the Internet).

In an embodiment, once a given brand has assigned a particular value to a machine readable code 101 for a given campaign, in this particular case a QR code (not limitative) that is localized inside the packaging of a product of the given brand, a user by using the end-user device 100 including processor and a computing application prepared to read the QR code 101 can scan the QR code 101. The QR code 101 can contain information, encrypted or double encrypted, regarding marketing campaign of said given brand, a product code and said particular value. Once the QR code 101 is scanned, the remote server 120 performs some checkings: a first one about properties of the QR code 101 and a second one to check if the QR code 101 has been scanned before by the user. Then, depending on the result of said checkings, the remote server 120 assigns a monetary compensation from the product brand to the user that is delivered through the computing application.

Preferably, the monetary compensation is transferred to the user once an accumulated given amount of money is reached. The user, once notified by the computing application, can decide, at any time, to take the money or, alternatively, keep accumulating the monetary compensation. When the user decides to take the money, the monetary compensation can be transferred to the user through the use of PayPal®, a bank transfer, an Instant Money service of a bank, among others.

Alternatively, when the QR code 101 has been read, or scanned, and the delivering of the monetary occurred, the delivering of the monetary compensation is disabled.

Moreover, it may happen that the scanning of the QR code 101 is only possible along a given period, in different time slots, before the delivering of the monetary compensation is disabled. In this case, preferably the computing application will notify the user when next scan can be done.

The remote server 120 can further store in a database (not illustrated), remote to or included in the remote server 120, the data of the user having received a given compensation and a location of said user when scanning the QR code 101. Furthermore, the remote server 120 can also verify, with the given brand help, whether the product is original from the brand avoiding in this way any fraud or fake possibility of the product and ensuring originality of the same.

With the scanning of the QR code 101, the given brand receives general information user data such as name and surname, date of birth, sex and email address.

Figure 2:
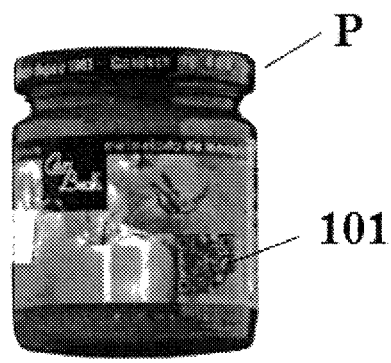
FIG. 2 is an example of a QR code included in the packaging of a product of a given brand.

Referring to FIG. 2, it is illustrated another embodiment, in this case the QR code 101 is localized in the packaging of a product P of a given brand so once the user has scanned the QR code 101 and the remote server 120 has performed said first checking about properties of the QR code 101, the second checking performed by the remote server 120 in this case checks whether the QR code 101 has been scanned more than a given maximum number of times. In case the scanned number of times is lower than the maximum number of times allowed by the invention, the remote server 120 assigns a monetary compensation from the product P brand to the user that is delivered through the computing application. This embodiment is particularly relevant for promoting and launching new products and promotions.

In other embodiments, the QR code 101 is associated to another readable code identifying the product. This second readable code may include another QR code, an alphanumeric code or a numeric code. Moreover, in yet other embodiments, the QR code 101 is embedded in the second readable code.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the scope of the embodiments.

The invention claimed is:

1. A computer implemented method for protecting and promoting products of a given brand by using machine readable codes, the method comprising:
assigning, by a given brand, a particular value to a machine readable code, said machine readable code been localized in a packaging of a product of said given brand;
scanning by a user said machine readable code by using a mobile computing device having installed therein a processor adapted to read said machine readable code;
upon said scanning being performed, establishing a communication between said processor and a remote server through a communication network in order, said remote server storing the scanned machine readable code and performing a first checking about properties of the machine readable code;
said remote server performing a second checking, whether the scanned machine readable code has been scanned before;
depending on the result of said checkings the remote server assigning a monetary compensation from the product brand to said user that is delivered through said processor; and
the processor informing the user about said checkings, wherein said machine readable code contains information regarding a marketing campaign of said given brand, a product code and said particular value encrypted.

2. A computer implemented method according to claim 1 wherein the remote server stores the data of the user having received a given compensation and a location of said user when scanning the machine readable code in a database.

3. A computer implemented method according to claim 1 wherein said first checking also verifies whether said product is original from the brand.

4. A computer implemented method according to claim 1, wherein when said checking results in the machine readable code being read once, and said delivering occurred, said delivering of a monetary compensation is disabled.

5. A computer implemented method according to claim 1, wherein said scanning of the machine readable code being possible along a given period, in different time slots, before said delivering of a monetary compensation being disabled.

6. A computer implemented method according to claim 5, wherein the processor notifies the user when said given period for performing said scanning is possible.

7. A computer implemented method according to claim 6 wherein said machine readable code is embedded in said another readable code identifying the product.

8. A computer implemented method according to claim 1 wherein said machine readable code includes at least a QR code.

9. A computer implemented method according to claim 8 wherein said machine readable code is associated to another readable code identifying the product, including at least a barcode, a QR code, an alphanumeric code or a numeric code.

10. A computer implemented method according to claim 1 wherein said machine readable code is associated to another readable code identifying the product, including at least a barcode, a QR code, an alphanumeric code or a numeric code.

11. A computer implemented method according to claim 1, wherein said monetary compensation is delivered to the user once an accumulated given amount of money is reached.

12. A computer implemented method according to claim 11, wherein the processor notifies the user when said accumulated given amount of money is reached.

13. A computer implemented method according to claim 12, wherein said user has access through said processor to said accumulated given amount.

14. A computer implemented method according to claim 1, wherein said machine readable code been placed inside said packaging of the product of said given brand.

15. A computer implemented method according to claim 1, wherein said information regarding a marketing campaign of said given brand, a product code and said particular value are double encrypted.

16. A computer implemented method for protecting and promoting products of a given brand by using machine readable codes, the method comprising:

assigning, by a given brand, a particular value to a machine readable code, said machine readable code been localized in a packaging of a product of said given brand;

scanning by a user said machine readable code by means of using a mobile computing device having installed therein a processor adapted to read said machine readable code;

upon said scanning being performed, establishing a communication between said computing application and a remote server through a communication network in order said remote server storing the scanned machine readable code and performing a first checking about properties of the machine readable code;

said remote server performing a second checking, whether the scanned machine readable code has been scanned more than a given maximum number of times;

depending on the result of said checkings the remote server assigning a monetary compensation from the product brand to the user that is delivered through said processor, and the processor informing the user about said checkings, wherein said machine readable code contains information regarding a marketing campaign of said given brand and said particular value encrypted.

17. The method of claim 16, wherein said monetary compensation is transferred to the user once an accumulated given amount of money is reached.

18. A computer implemented method according to claim 16 wherein the remote server stores the data of the users having received a given compensation in a database and a location of said user when scanning the machine readable code.

19. A computer implemented method according to claim 16 wherein said checking also verifies whether said product is original from the brand.

20. A computer implemented method according to claim 16, wherein said information regarding a marketing campaign of said given brand, said product code and said particular value are double encrypted.

* * * * *